S. G. HULL.
FRUIT CHUTE OR CONVEYER.
APPLICATION FILED AUG. 6, 1918.
1,297,353.
Patented Mar. 18, 1919.
2 SHEETS—SHEET 1.
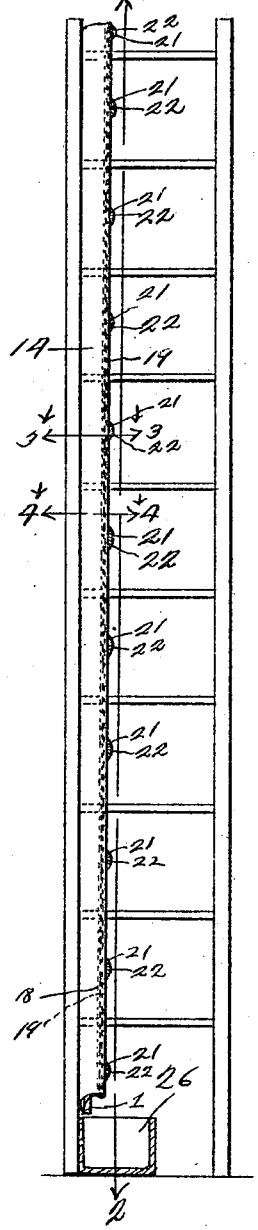
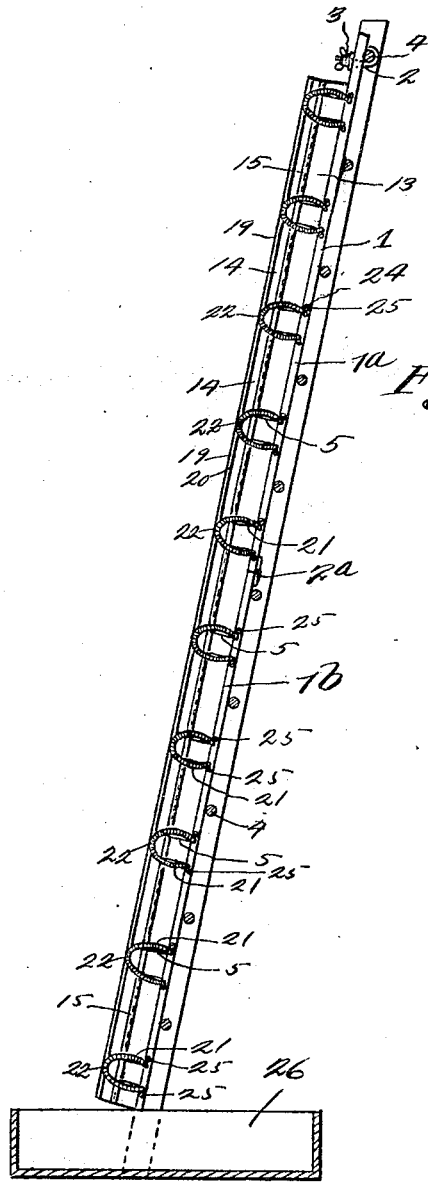
Witnesses
Inventor
S. G. Hull
By D. Swift & Co.
Attorneys S. G. HULL.
FRUIT CHUTE OR CONVEYER.
APPLICATION FILED AUG. 6, 1918.
1,297,353.
Patented Mar. 18, 1919.
2 SHEETS—SHEET 2.
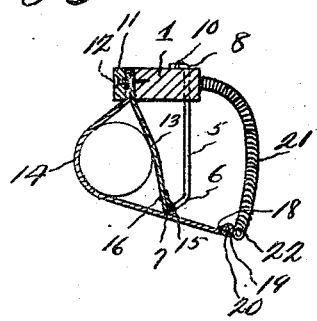
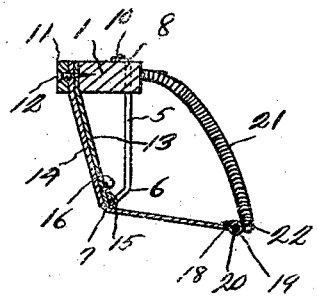
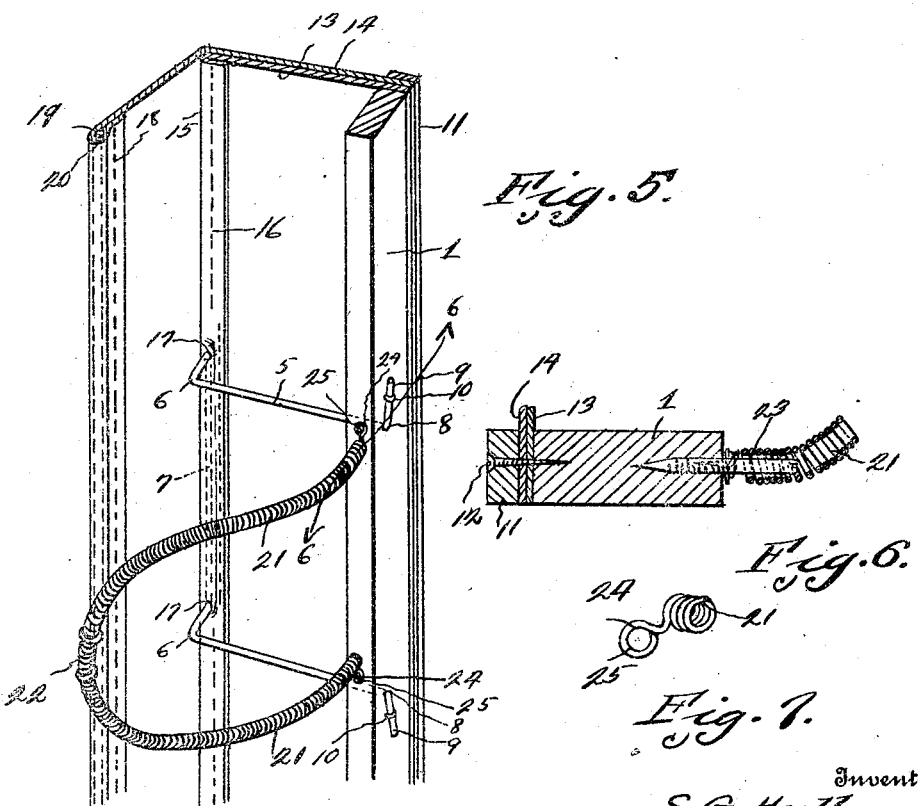
Inventor
S. G. Hull

UNITED STATES PATENT OFFICE.

SAMUEL G. HULL, OF APOPKA, FLORIDA.

FRUIT CHUTE OR CONVEYER.

1,297,353.  Specification of Letters Patent.  Patented Mar. 18, 1919.

Application filed August 6, 1918. Serial No. 248,538.

*To all whom it may concern:*

Be it known that I, SAMUEL G. HULL, a citizen of the United States, residing at Apopka, in the county of Orange, State of Florida, have invented a new and useful Fruit Chute or Conveyer; and I do hereby declare the following to be a full, clear, and exact description of the invention, such as will enable others skilled in the art to which it appertains to make and use the same.

This invention relates to an improved fruit chute or conveyer, and the invention aims to provide a device of this kind, adapted particularly for use in connection with ladders, when used to support persons while picking the fruit from trees, said chute or conveyer acting to guide the fruit toward and into a receptacle at the base of the ladder.

The invention further aims to provide an improved chute used in the foregoing manner, so as to guide the fruit to the receptacle gradually, thereby preventing bruising which would undoubtedly occur if thrown into the receptacle or dropped.

The invention further aims to provide a stationary jaw having a fabric wall, and a yieldable fabric jaw to coöperate with the fabric wall, and between which yieldable jaw and fabric wall the fruit is guided into said receptacle. The invention further aims to provide means for detachably connecting the chute or conveyer to one of the upper rungs of a ladder.

In practical fields the details of construction may necssitate alterations falling within the scope of what is claimed.

The invention comprises further features and combination of parts as hereinafter set forth shown in the drawings and claimed.

In the drawings:—

Figure 1 is a view in front elevation showing the improved chute or conveyer as applied to a ladder.

Fig. 2 is a sectional view on line 2—2 of Fig. 1 showing the application of the chute to the ladder.

Fig. 3 is a sectional view on line 3—3 of Fig. 1, showing the fruit between the fabric stationary wall and the yieldable fabric jaw.

Fig. 4 is a sectional view on line 4—4 of Fig. 1, showing the fabric jaw in contact with the stationary fabric wall.

Fig. 5 is an enlarged detail perspective view of a section of the chute, showing the yieldable fabric jaw closed.

Fig. 6 is an enlarged detail sectional view on line 6—6 of Fig. 5.

Fig. 7 is an enlarged detail view showing the connection of the ends of the arms of the yieldable U-shaped members of the yieldable fabric jaw.

Referring more especially to the drawings, 1 designates an elongated strip, transversely through the upper end of which the shank of a hook 2 extends. A thumb nut 3 is threaded on the shank, and after the hook is placed in engagement with one of the rungs of the ladder, preferably one of the upper rungs 4, the strip 1 may be supported. The greater portion of the strip lies against the lower rungs of the ladder, as shown clearly in Figs. 1 and 2. Projecting laterally from the strip and at intervals along the same is a plurailty of U-shaped members 5, the arms of which are bent at 6, so as to dispose the transverse arches 7 laterally. The terminals of the arms of each U-shaped member pass through the strip and are bent as at 8, and these bent portions 9 are secured by staples or the like 10 to the strip. On one edge of the strip 1, and by means of an elongated cleat 11 (which is secured by screws 12 to the strip) are inner and outer fabric strip jaws 13 and 14. The outer edge portion of the fabric jaw 13 is folded upon itself as shown at 15, and stitched at 16, so that the fold will receive the arches of the U-shaped members 5. In fact before the fold is made the arms of the U-shaped members 5 are inserted through the outer longitudinal edge portion of the fabric jaw 13, as shown at 17, and after which the fold is made and the folded part then stitched. The fabric jaws 13 may be constructed of any suitable material preferably heavy canvas or the like. It is to be noted that the jaw 14 greatly exceeds the width of the jaw 13, that is in cross section, so that jaw 14 may overlap the jaw 13, as shown clearly in Figs. 3, and 4 and 5. The outer edge portion of the jaw 14 is folded longitudinally upon itself and stitched as shown at 18, and in the fold 19 is a flexible wire 20 preferably of copper or the like which is designed to hold the edge portion of the jaw 14 reasonably in shape in fact to prevent excessive distortion of the edge portion of the jaw. At intervals along the strip there are secured flexible or yieldable loops 21 which are constructed of spring coils, the convolutions of which are wound close together. The arches of the loops are stitched or otherwise wrapped or fastened at 22 to the comparatively stiffened fold of the jaw 14. It is to be noted that these flexible loops hold the jaw 14 normally in contact with the jaw 13. The fruit as it is picked from the tree may be inserted between the jaws at their upper ends, or between the jaws at the intervals between the loops, preferably the latter. The ladder may be disposed at an angle to the tree, and when the person picking the fruit is at the top of the ladder, the fruit may be passed between the jaws at their upper ends. However, as the person moves down the ladder picking the fruit, it may be passed between the jaws at the spaces between the yieldable loops. Projections 23 are threaded into one edge of the strip 1, and the end parts of the coil arms of the loops are passed telescopically over said projections, and the extremities of the wire of the ends of the arms are extended laterally and formed into eyes 24, to receive screws 25. It is to be noted that by adjusting the screws 25 outwardly, the ends of the arms of the loops may be adjusted on the projections 23. As the jaw 14 is open at different locations to insert a piece of fruit, said jaw partially releases the fruit previously inserted between the jaws allowing a gradual feed of the fruit downwardly in to the receptacle 26, which is arranged at the base of the ladder. After picking enough fruit to fill the receptacle, what fruit is allowed to remain between the jaws is released, by separating the jaws, by applying pressure laterally upon the loops. The elongated strip 1 consists of two sections 1ª and 1ᵇ, the adjacent ends of which are hingedly united by the hinge connection 2ª, whereby the two sections may be folded into a compact form, for shipping or storing, and whereby the device may be easily and conveniently carried from one place to another.

The invention having been set forth what is claimed as new and useful is:—

1. In a chute used when gathering fruit, the combination with an elongated strip, of a stationary fabric jaw extending longitudinally of the strip, U-shaped supporting and stiffening members arranged at intervals along the strip to support the stationary fabric jaw, a flexible fabric jaw coöperating with and overlapping the stationary jaw, yieldable loops connecting between the strip and the flexible movable jaw at intervals along the strip.

2. In a chute used when gathering fruit, the combination with an elongated strip having means for suspending the same on a ladder, of a movable flexible jaw, a stationary flexible jaw with and over which the movable jaw extends and coöperates, U-shaped stiffening members connected to the strip for stiffening the stationary jaw at intervals along the strip, a plurality of yieldable loops having their arms adjustably connected to the strip and their arches attached to the movable jaw, whereby the yieldable jaw may yield relatively to the stationary jaw, and a flexible wire in the longitudinal edge of the movable jaw.

In testimony whereof I have signed my name to this specification in the presence of two subscribing witnesses.

SAMUEL G. HULL.

Witnesses:
 Le Roy L. Hull,
 A. J. Lowell.

Copies of this patent may be obtained for five cents each, by addressing the "Commissioner of Patents, Washington, D. C."